US012425132B2

(12) United States Patent
Mu

(10) Patent No.: US 12,425,132 B2
(45) Date of Patent: Sep. 23, 2025

(54) MULTI-TB INTERLEAVING TRANSMISSION PROCESSING METHOD AND APPARATUS, COMMUNICATION DEVICE AND STORAGE MEDIUM

(71) Applicant: Beijing Xiaomi Mobile Software Co., Ltd., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 640 days.

(21) Appl. No.: 17/775,165

(22) PCT Filed: Nov. 7, 2019

(86) PCT No.: PCT/CN2019/116401
§ 371 (c)(1),
(2) Date: May 6, 2022

(87) PCT Pub. No.: WO2021/087911
PCT Pub. Date: May 14, 2021

(65) Prior Publication Data
US 2022/0393793 A1 Dec. 8, 2022

(51) Int. Cl.
*H04L 1/00* (2006.01)
*H04B 1/7136* (2011.01)
*H04W 72/0446* (2023.01)

(52) U.S. Cl.
CPC ......... *H04L 1/0071* (2013.01); *H04B 1/7136* (2013.01); *H04W 72/0446* (2013.01)

(58) Field of Classification Search
CPC ....... H04L 1/0071; H04L 1/08; H04L 5/0053; H04B 1/7136; H04B 1/713;
(Continued)

(56) References Cited

U.S. PATENT DOCUMENTS

2003/0198310 A1 10/2003 Fanson et al.
2013/0170467 A1 7/2013 Ogawa et al.
(Continued)

FOREIGN PATENT DOCUMENTS

CN 106605438 A 4/2017
CN 109565661 A 4/2019
(Continued)

OTHER PUBLICATIONS

Chinese Office Action issued Oct. 20, 2022 for Chinese Patent Application No. 201980002853.X.

*Primary Examiner* — Mandish K Randhawa
(74) *Attorney, Agent, or Firm* — Volpe Koenig

(57) ABSTRACT

Embodiments of the present disclosure provides a multi-TB interleaving transmission processing method and apparatus, a communication device, and a storage medium. The multi-TB interleaving transmission processing method include: determining a granularity of interleaving transmission units for multi-TB interleaving transmission, where the granularity of the interleaving transmission units is a number of times one TB in the interleaving transmission units being transmitted repeatedly; determining an absolute subframe i for transmitting the j-th TB according to the granularity of the interleaving transmission units, where j is a positive integer, and i is 0 or a positive integer; determining a second frequency hopping interval of the multi-TB interleaving transmission according to a first frequency hopping interval of single-TB frequency hopping transmission; and determining a narrowband used by the absolute subframe i for transmitting the j-th TB according to the second frequency hopping interval.

20 Claims, 6 Drawing Sheets

(58) Field of Classification Search
CPC ... H04W 72/0446; H04W 4/70; H04W 72/23; H04W 72/535; Y02D 30/70
See application file for complete search history.

(56) References Cited

U.S. PATENT DOCUMENTS

2021/0051636 A1* 2/2021 Sengupta ............... H04B 1/713
2022/0086870 A1* 3/2022 Hu ..................... H04W 72/535

FOREIGN PATENT DOCUMENTS

| | | |
|---|---|---|
| CN | 110139247 A | 8/2019 |
| CN | 110268662 A | 9/2019 |
| CN | 110326350 A | 10/2019 |
| WO | WO-2021031023 A1 * | 2/2021 |

* cited by examiner

MULTI-TB INTERLEAVING TRANSMISSION PROCESSING METHOD AND APPARATUS, COMMUNICATION DEVICE AND STORAGE MEDIUM

CROSS REFERENCE TO RELATED APPLICATIONS

This present application is a U.S. National Stage of International Application No. PCT/CN2019/116401, filed on PCT Nov. 7, 2019, the contents of all of which are incorporated herein by reference in their entireties for all purposes.

BACKGROUND

In recent years, the Internet of Things has developed vigorously, bringing a lot of convenience to human life and work. Among them, machine type communication (MTC) is a typical representative of cellular IoT technology. At present, this technology has been widely applied in smart cities, such as meter reading; smart agriculture, such as information collection including temperature and humidity; smart transportation, such as shared bicycles, and many other fields.

A basic framework of the MTC technology and narrow band Internet of Things (NB-IoT) technology is proposed in Long Term Evolution (LTE) release 13. Considering the wide disclosure of the MTC technology, and the disclosure scenarios are all scenarios that do not require high communication capabilities, such as data collection, so a major feature of MTC is a low manufacturing cost. Meanwhile, in order to reduce the manufacturing cost, the processing capability of MTC is also greatly reduced as compared to ordinary mobile phones. Since MTC is mostly deployed in basements, in the wild and other scenes with poor coverage, and due to the limitation of terminal hardware, the coverage of most MTC is not as good as that of ordinary LTE users. For the purpose of coverage enhancement, a mechanism of repeated transmission is introduced for MTC to obtain an effect of power accumulation in a time dimension.

SUMMARY

The present disclosure relates to, but is not limited to, the technical field of wireless communication, in particular to a multi-TB (transmission block) transmission processing method and an apparatus, communication device and a storage medium.

Embodiments in the present disclosure provide a multi-TB interleaving transmission processing method and apparatus, a communication device, and a storage medium.

The first aspect of an embodiment in the present disclosure provides a multi-TB interleaving transmission processing method, including:
  determining a granularity of interleaving transmission units for multi-TB interleaving transmission, where the granularity of the interleaving transmission units is a number of times one TB in the interleaving transmission units being transmitted repeatedly;
  determining an absolute subframe i for transmitting the j-th TB according to the granularity of the interleaving transmission units, where the j is a positive integer, and the i is 0 or a positive integer;
  determining a second frequency hopping interval of the multi-TB interleaving transmission according to a first frequency hopping interval of single-TB frequency hopping transmission; and
  determining a narrowband used by the absolute subframe i for transmitting the j-th TB according to the second frequency hopping interval.

The second aspect of an embodiment in the present disclosure provides a multi-TB interleaving transmission processing apparatus, including:
  a first determining module, configured to determine a granularity of interleaving transmission units for multi-TB interleaving transmission, where the granularity of the interleaving transmission units is a number of times one TB in the interleaving transmission units being transmitted repeatedly;
  a second determining module, configured to determine an absolute subframe i for transmitting the j-th TB according to the granularity of the interleaving transmission units, where the j is a positive integer, and the i is 0 or a positive integer;
  a third determining module, configured to determine a second frequency hopping interval of the multi-TB interleaving transmission according to a first frequency hopping interval of single-TB frequency hopping transmission; and
  a fourth determining module, configured to determine a narrowband used by the absolute subframe i for transmitting the j-th TB according to the second frequency hopping interval.

The third aspect of an embodiment in the present disclosure provides a communication device, including:
  a transceiver;
  a memory; and
  a processor, connected with the transceiver and the memory respectively, and configured to control the transceiver to transmit and receive wireless signals through executing computer-executable instructions stored in the memory, so as to realize the method comprise:
  determining a granularity of interleaving transmission units for multi-TB interleaving transmission, where the granularity of the interleaving transmission units is a number of times one TB in the interleaving transmission units being transmitted repeatedly;
  determining an absolute subframe i for transmitting the j-th TB according to the granularity of the interleaving transmission units, where the j is a positive integer, and the i is 0 or a positive integer;
  determining a second frequency hopping interval of the multi-TB interleaving transmission according to a first frequency hopping interval of single-TB frequency hopping transmission; and
  determining a narrowband used by the absolute subframe i for transmitting the j-th TB according to the second frequency hopping interval.

The fourth aspect of an embodiment in the present disclosure provides a non-transitory computer storage medium, where computer-executable instructions are stored in the non-transitory computer storage medium; and the computer-executable instructions are executed by the processor to implement the method comprise:
  determining a granularity of interleaving transmission units for multi-TB interleaving transmission, where the granularity of the interleaving transmission units is a number of times one TB in the interleaving transmission units being transmitted repeatedly;
  determining an absolute subframe i for transmitting the j-th TB according to the granularity of the interleaving transmission units, where the j is a positive integer, and the i is 0 or a positive integer;

determining a second frequency hopping interval of the multi-TB interleaving transmission according to a first frequency hopping interval of single-TB frequency hopping transmission; and determining a narrowband used by the absolute subframe i for transmitting the j-th TB according to the second frequency hopping interval.

DETAILED DESCRIPTION

Figure 1:
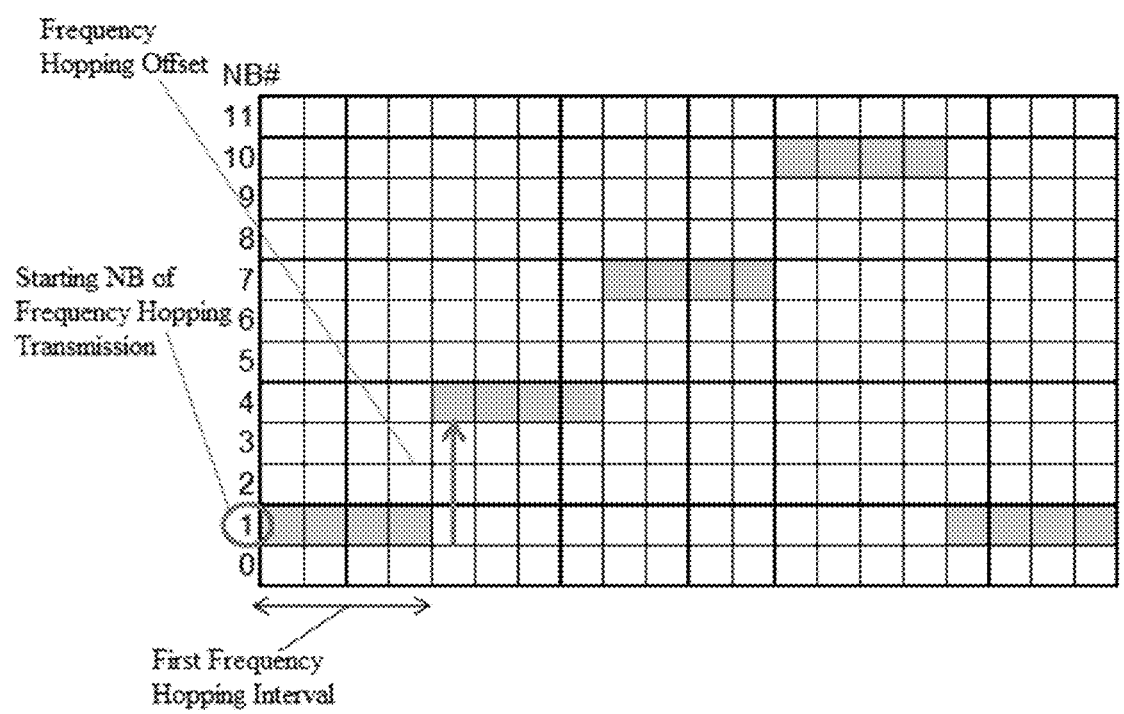
FIG. 1 is a schematic diagram of frequency hopping transmission.

Examples are explained in details, and the examples are shown in the drawings. In case that the drawings are involved in the following descriptions, unless otherwise indicated, the same number in different drawings indicate the same or similar element. The implementation modes described in the following examples do not represent all the implementation modes consistent with the embodiments of the present disclosure. On the contrary, they are just examples of apparatus and method as described in details in the claims and consistent with some aspects of the embodiments of the disclosure.

The terms used in the embodiments of the present disclosure are merely intended to describe specific embodiments, rather than limiting the embodiments of the present disclosure. The singular forms such as "a", "an" and "the" used in the embodiments and claims of the present disclosure are also intended to include plural forms, unless other meanings are cleared expressed in the context. Additionally, the term of "and/or" used in the text refers to and includes any or all possible combinations of one or a plurality of associated listed items.

Further, the terms of first, second, third and so on are used for describe various information in the embodiments of the present disclosure as much as possible, the information does not limit these terms. These terms are merely used for distinguishing information of the same type. For example, under the condition without deviating from the scope of the embodiments of the present disclosure, the first information may also be called as the "second information", and similarly, the second information may also be called as the "first information". Depending on the context, for example, the word "if" used here may be explained as "at the time of" or "at the moment of" or "in response to determining".

In MTC, a data block is subjected to several repeated transmissions for coverage enhancement. At the same time, in order to obtain better frequency diversity gain, frequency hopping transmission will be applied to repeated transmissions of a plurality of data blocks. In addition, a gain of cross-subframe channel estimation and a gain of symbol merging are ensured in the frequency hopping transmission.

FIG. 1 is a schematic diagram of frequency hopping transmission. In FIG. 1, the horizontal axis is a time axis, and the vertical axis is a frequency axis. On the horizontal axis, each square corresponds to a subframe. There are twelve narrow bands (NB) displayed on the vertical axis. In this way, the frequency hopping transmission as shown in FIG. 1 has four frequency hopping intervals, that is, after four subframes are continuously transmitted on one NB, and then the transmission is changed to another NB.

Figure 2:
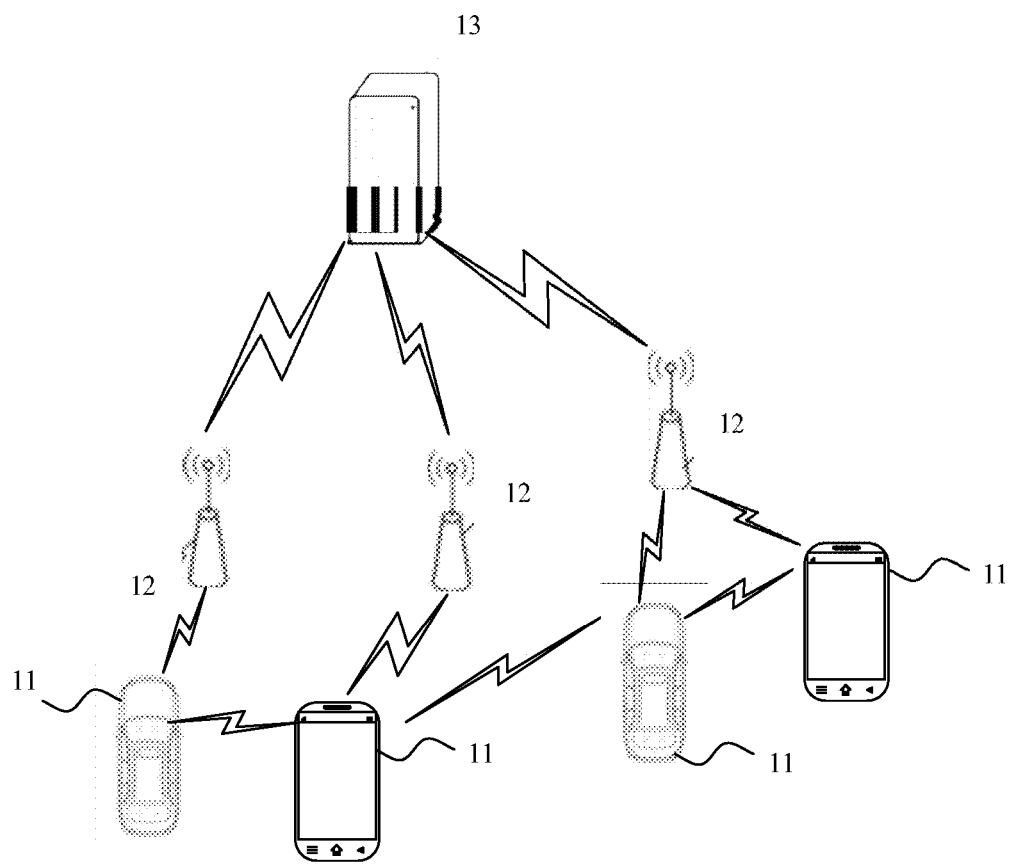
FIG. 2 is a structural diagram of a communication system provided by an embodiment of the present disclosure.

FIG. 2 shows a structural diagram of a wireless communication system provided by an embodiment of the present disclosure. As shown in FIG. 2, the wireless communication system is a communication system based on cellular mobile communication technology, and the wireless communication system includes a plurality of UE 11 and a plurality of base stations 12.

Among them, the UE 11 may be a device that provides voice and/or data connectivity to a user. The UE 11 is able to communicate with one or more core networks via a radio access network (RAN), and the UE 11 may be IoT UE, such as a sensor device and a mobile phone (or "cellular" phone), and a computer with IoT UE. For example, the UE 11 may be a stationary, portable, pocket-sized, hand-held, computer-built-in or vehicle-mounted device, such as a station (STA), a subscriber unit, a subscriber station, a mobile station, a mobile, a remote station, an access point, a remote UE (remote terminal), an access UE (access terminal), a user device (user terminal), a user agent, a user device or user equipment (UE). The UE 11 may also be a device of an unmanned aerial vehicle. Additionally, the UE 11 may also be a vehicle-mounted device, for example, a trip computer with a wireless communication function, or a wireless communication device externally connected to a trip computer. Further, the UE 11 may also be a roadside device, for example, a streetlight, a signal light, or other roadside device with the wireless communication function.

The base station 12 may be a network-side device in a wireless communication system. The wireless communication system may be a 5G system, also known as a new radio (NR) system or a 5G NR system. The wireless communication system may be a system supporting new-radio unlicensed (NR-U) spectrum communication. Further, the wireless communication system may also be a next-generation system of the 5G system. Among them, an access network in the 5G system may be called a new generation—radio access network (NG-RAN).

Among them, the base station 12 may be a base station (gNB) that adopts a centralized distributed architecture in the 5G system. In case that the centralized distributed architecture is adopted, the base station 12 usually includes a central unit (CU) and at least two distributed units (DU). A protocol stack with a packet data convergence protocol (PDCP) layer, a radio link control (RLC) protocol layer and a media access control (MAC) layer is set in the central unit. A physical (PHY) layer protocol stack is set in each of the distributed unit, and the embodiment of the present disclosure has no limitation on the specific implementation mode of the base station 12.

Wireless connection may be established between the base stations 12 and the UE 11 through a wireless air interface. In different implementation modes, the wireless air interface is a wireless air interface based on the $5^{th}$-generation mobile communication network technology (5G) standard, for example, the wireless air interface is a new air interface. The wireless air interface may also be a wireless air interface based on a next generation of the 5G mobile communication network technology standard.

In some embodiments, end-to-end (E2E) connection may also be established between the UE 11. In some embodiments, the above wireless communication system may also include a network management device 13.

The base stations 12 are connected to the network management device 13, respectively. Among them, the network management device 13 may be a core network device in the wireless communication system, for example, the network management device 13 may be a mobility management entity (MME) in an evolved packet core (EPC) network. The network management device may also be other core network devices, such as a serving gateway (SGW), a public data network gateway (PGW), a policy and charging rules function (PCRF) unit or a home subscriber server (HSS). The embodiment of the present disclosure has no limitation on an implementation form of the network management device 13.

Figure 3:
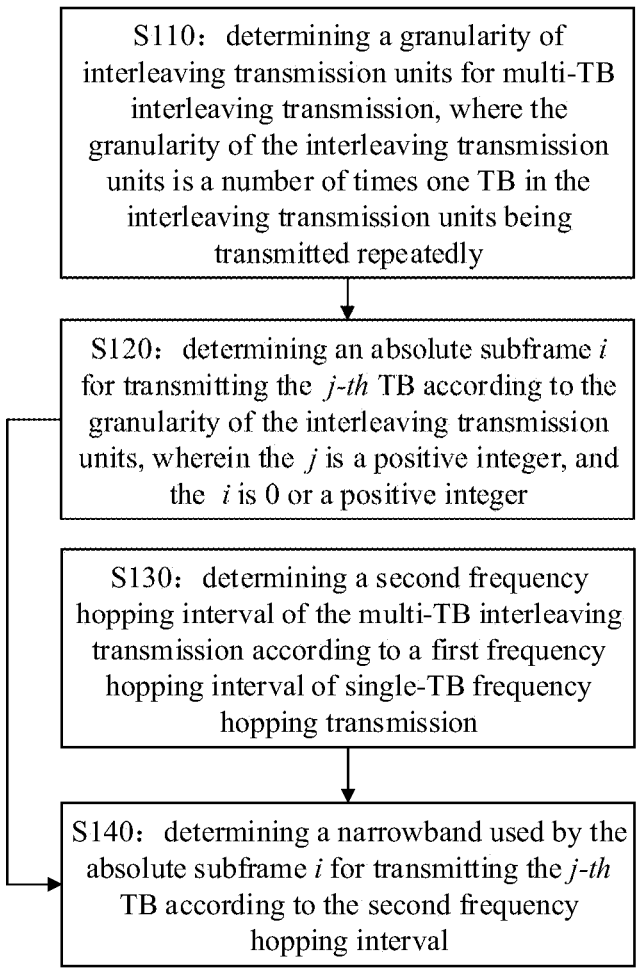
FIG. 3 is a flow chart of a multi-TB interleaving transmission processing method provided by an embodiment of the present disclosure.

As shown in FIG. 3, an embodiment in the present disclosure provides a multi-TB interleaving transmission processing method, including the following steps. In step S110: determining a granularity of interleaving transmission units for multi-TB interleaving transmission, where the granularity of the interleaving transmission units is a number of times one TB in the interleaving transmission units being transmitted repeatedly. Then in step S120: determining an absolute subframe i for transmitting the j-th TB according to the granularity of the interleaving transmission units, where the j is a positive integer, and the i is 0 or a positive integer. Step S130: determining a second frequency hopping interval of the multi-TB interleaving transmission according to a first frequency hopping interval of single-TB frequency hopping transmission. Finally, in step S140: determining a narrowband used by the absolute subframe i for transmitting the j-th TB according to the second frequency hopping interval. In some embodiments, step S130 and step S110 may be performed in any order, for example, step S130 may be performed before step S110, or step S130 may be performed after step S110, or alternatively, step S130 and step S110 may be performed simultaneously.

The method provided by the embodiment of the present disclosure may be applied for base stations or UE, and the UE includes, but is not limited to, MTC UE.

In case that the method is used in a base station, based on the method, the base station may determine a transmitted subframe and an occupied narrowband of a downlink TB, and transmit the downlink TB on the determined subframe and narrowband. Correspondingly, the UE may determine a subframe and a narrowband for receiving the downlink TB by using this method.

In case that the method is used in UE, based on the method, the terminal may determine a transmitted subframe and an occupied narrowband of an uplink TB, and transmit the uplink TB on the determined subframe and narrowband. Correspondingly, the base station may determine a subframe and a narrowband for receiving the uplink TB by using the method, and receive the uplink TB on the determined subframe and the occupied narrowband.

The multi-TB interleaving transmission is a transmission mechanism of transmitting a plurality of TBs in turns. In the embodiment, the multi-TB interleaving transmission is a transmission mechanism in which transmission is performed using interleaving transmission units as the unit. An interleaving transmission unit includes: w repeated transmissions of a certain TB to be transmitted. Where w is a positive integer less than or equal to a total number of transmission times of a single TB, and the w is the granularity of the above-mentioned interleaving transmission unit. The multi-TB interleaving transmission transmits the interleaving transmission units of TBs to be transmitted in turn. As long as the interleaving transmission units corresponding to each TB has been transmitted once, a round of multi-TB interleaving transmission is completed. After one round of multi-TB interleaving transmission is completed, a next round of multi-TB interleaving transmission may be performed until each TB satisfies the specified number of repeated transmissions.

For example, TB1-TB4 are transmitted using the multi-TB interleaving transmission. Each TB of TB1-TB4 is repeatedly transmitted for eight times, and the granularity of the interleaving transmission units is determined to be two. At this time, a transmitting end (base station or UE) will transmit the interleaving transmission units corresponding to TB1-TB4 in sequence, that is, two repeated transmissions of TB1-TB4 are performed in sequence. After the base station transmits one interleaving transmission unit corresponding to TB1-TB4 in sequence, the base station completes a round of interleaving transmission. For example, at this time, the previous round of multi-TB interleaving transmission is completed by transmitting TB1 for twice, TB2 for twice, TB3 for twice and TB4 for twice in sequence, and a next round of multi-TB interleaving transmission is performed. Thus, the repeated transmission of TB1-TB4 is performed for eight times by four rounds of multi-TB interleaving transmission.

In the technical solutions provided by the embodiments in the present disclosure, in order to coordinate a resource scheduling conflict caused by the use of multi-TB interleaving transmission and frequency hopping transmission respectively, in response to determining that both transmission mechanisms namely the multi-TB interleaving transmission and the frequency hopping transmission are used simultaneously, the granularity of interleaving transmission units of the multi-TB interleaving transmission will be determined first. Then an absolute subframe used for transmitting the TB will be determined first in combination with the granularity. A second frequency hopping interval of the entire multi-TB interleaving transmission is determined according to a first frequency hopping interval of single-TB frequency hopping transmission. A narrowband where a subframe used is located is determined according to the second frequency hopping interval. In this way, the coordination or coordinated use of the multi-TB interleaving transmission and the frequency hopping transmission is realized, so that these two mechanisms of multi-TB interleaving transmission and frequency hopping transmission can be used without conflict, and as a result, a time diversity early gain and a frequency diversity gain at a receiving end are enhanced.

Figure 4:
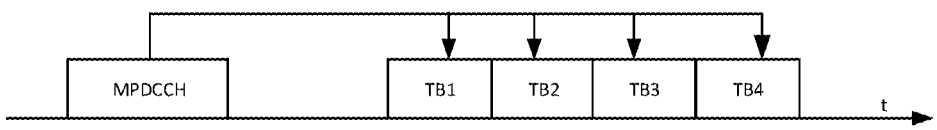
FIG. 4 is a schematic diagram of MPDCCH-scheduled multi-TB transmission provided by an embodiment of the present disclosure.

FIG. 4 shows that an MTC physical downlink control channel (MPDCCH) schedules four TBs, namely TB1-TB4.

In this way, it is realized that one MPDCCH schedules multiple TB transmissions. The scheduled TB may be either an uplink TB or a downlink TB.

Figure 5:
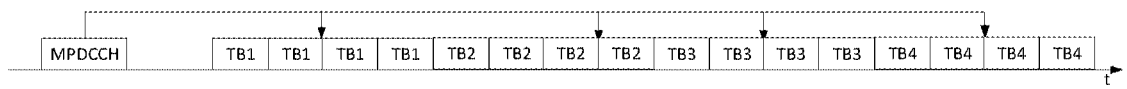
FIG. 5 is a schematic diagram of multi-TB repeated transmission provided by an embodiment of the present disclosure.

FIG. 5 shows that the MPDCCH schedules multiple transmissions of one TB at one time, so that the number of repeated transmissions of a single TB occurs, and the diversity gain of the TB in a time domain is obtained.

Figure 6:
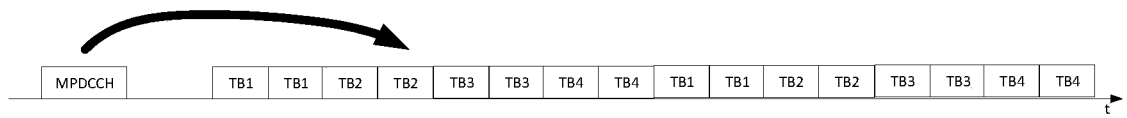
FIG. 6 is a schematic diagram of multi-TB repeated transmission provided by an embodiment of the present disclosure.

In order to increase a time diversity effect and improve the transmission efficiency, an interleaving transmission mechanism is introduced. FIG. 6 shows the transmission effect after the interleaving transmission is introduced according to the TB scheduled in FIG. 5. The four transmissions will be broken up in the time domain. The multiple transmissions of one TB are no longer continuous transmissions after being broken up. FIG. 5 shows the multi-TB interleaving transmission.

In FIG. 5, the multi-TB interleaving transmission is performed using the interleaving transmission units as the unit. One interleaving transmission unit includes: two transmissions of one TB, and the two transmissions are consecutive. Thus, the granularity of the interleaving transmission unit may be: a number of repeated transmissions P of one TB, where P is equal to two in FIG. 4. In some embodiments, the P transmissions of one TB in an interleaving transmission unit are consecutive.

In FIG. 4-FIG. 6, the horizontal axis represents a time axis, which is indicated by t.

After the granularity of the interleaving transmission unit is determined, a subframe No. of an absolute subframe carrying each TB is determined according to the granularity. In case that the subframe No. of the absolute subframe is determined, a time domain resource (e.g., absolute subframe) for transmitting the corresponding TB is determined.

In order to realize the coordinated use of multi-TB interleaving transmission and frequency hopping transmission, the time diversity gain and frequency diversity gain of one TB are simultaneously realized, and the phenomenon of inconsistency between the interleaving transmission and the frequency hopping transmission is also reduced. In the embodiment of the present disclosure, the first frequency hopping interval of a single TB is determined first.

The first frequency hopping interval is: an interval of time domain resources between two adjacent transmissions using different frequency bands. For example, the first frequency hopping interval may be x subframes. After x subframes are transmitted on a first frequency band, the transmission is skipped to a second frequency band. The first frequency hopping interval is the frequency hopping interval of single-TB frequency hopping transmission.

In the embodiment of the present disclosure, since the multi-TB interleaving transmission is adopted, the first frequency hopping interval of the single-TB frequency hopping transmission will not be directly used for transmission. Instead, the frequency hopping interval in case of using the frequency hopping transmission in the multi-TB interleaving transmission, namely the second frequency hopping interval, will be further determined according to the first frequency hopping interval.

The narrowband used by the corresponding TB is then determined in combination with the second frequency hopping interval. Therefore, this method will reduce the conflict caused by the independent determination of two transmission mechanisms including the multi-TB interleaving transmission and the frequency hopping transmission, so that the user can obtain the time diversity gain and the frequency diversity gain at the same time.

In some embodiments, the S110 may also include determining the granularity of the interleaving transmission units according to the first frequency hopping interval Ych1, where the Ych1 is a positive integer.

In some embodiments, the granularity of the interleaving transmission units may be determined according to the first frequency hopping interval. For example, the first frequency hopping interval is directly set as the granularity of the interleaving transmission units.

Specifically, the S110 may include one of the following: determining the Ych1 as the granularity of the interleaving transmission units; selecting a maximum value from a first value set ((1/M1)*Ych1,1) consisting of the Ych1 and a first parameter M1, and determining the maximum value as the granularity of the interleaving transmission units; and determining the granularity of the interleaving transmission units as M2*Ych1 according to the first frequency hopping interval Ych1 and a second parameter M2.

For example, Ych1 is four, in case that the Ych1 is determined as the granularity of the interleaving transmission units, the granularity of the interleaving transmission units is four, too.

The first parameter may be a reciprocal coefficient, and the reciprocal coefficient may be any positive integer. The maximum value is selected from the first value set as the granularity of the interleaving transmission units. Since the minimum value of the first value set is one, the minimum granularity of the interleaving transmission units is one. For example, the Ych1 is four, in case that the M1 is two, the first value set contains two elements as one and two respectively, because two is greater than one, the granularity of the interleaving transmission units determined based on the first parameter is two.

In some embodiments, the multi-TB interleaving transmission processing method further introduces a second parameter, and the second parameter may be a coefficient. The granularity of the interleaving transmission units is: M2 times the first frequency hopping interval. The M2 may be any positive number, for example, a decimal or an integer.

In some embodiments, whether the first parameter or the second parameter is used for determining the granularity of the interleaving transmission units may be determined according to the values of the first frequency hopping interval and a preset value.

For example, in case that the first frequency hopping interval is less than the preset value, the granularity of the interleaving transmission units is determined based on the second parameter. In case that the first frequency hopping interval is greater than or equal to the preset value, the granularity of the interleaving transmission units is determined based on the first parameter.

In some embodiments, the first parameter is predefined. For example, the first parameter is configured in a communication protocol. In this way, at the time of configuring a base station and UE, the first parameter is written into the base station and the UE, and thus the first parameter is known by the base station and the UE in common.

The first parameter is configured by a base station. For example, the base station issues the first parameter through higher layer signaling or physical layer signaling. The higher layer signaling includes, but is not limited to, radio resource control (RRC) layer signaling.

In some embodiments, the first parameter is determined according to a number of TBs for the multi-TB interleaving transmission. For example, in case that there are more TBs in one interleaving transmission and the TBs in each interleaving transmission unit are repeatedly transmitted for many times, one transmission in one TB interleaving transmission will occupy a long-time domain resource continuously, which will possibly affect the transmission of other UE or businesses. At this time, a relatively small granularity of the interleaving transmission units may be set. The number of repeated transmissions of all TBs reaches a preset number of times through multiple transmissions of the interleaving transmission units.

In some embodiments, the second parameter is configured by higher layer signaling. The second parameter may be signaled by a higher layer, and the higher layer signaling is signaled by higher layer above the physical layer, such as a radio link control (RLC) layer.

In some embodiments, the second parameter is determined according to a number of frequency hopping narrowbands in the frequency hopping transmission. For example, the second parameter may be directly equal to the number of frequency hopping narrowbands. For another example, the second parameter may be a preset multiple of the number of frequency hopping narrowbands.

In some embodiments, the S110 may also include: determining the granularity of the interleaving transmission units according to user dedicated signaling of TBs for the multi-TB interleaving transmission.

The user dedicated signaling may include, but is not limited to, user specific PDCCH signaling. The PDCCH signaling is the signaling transmitted using the PDCCH. In this way, a base station may determine the granularity of the interleaving transmission units through the user dedicated signaling.

In some embodiments, the S110 may also include determining the granularity of the interleaving transmission units by selecting a value from a second value set according to the configuration information of the user dedicated signaling, where the second value set includes candidate values of the first frequency hopping interval corresponding to enhanced coverage classes used for TB transmission.

For example, at the time of performing TB transmission, different enhanced coverage classes may be used, and the enhanced coverage classes have a corresponding relationship with the configuration of the frequency hopping interval of single-TB frequency hopping transmission. The higher the enhanced coverage level, the higher the transmission power of the corresponding TB.

The second value set includes one or more candidate values of the first frequency hopping interval, and these candidate values are reused as candidate values of the granularity of the interleaving transmission units.

In the embodiment, in an enhanced coverage mode A of frequency division duplexing (FDD), the second value set is {1, 2, 4, 8}; and in an enhanced coverage mode B of FDD, the second value set may be {2, 4, 8, 16}.

In an enhanced coverage mode A of time division duplexing (TDD), the second value set is {1, 5, 10, 20}; and in an enhanced coverage mode B of TDD, the second value set may be {5, 10, 20, 40}.

In this way, through the configuration information of the user dedicated signaling, on the one hand, the configuration of the frequency hopping interval of the single-TB interleaving transmission is realized. On the other hand, in case that a base station or UE uses the multi-TB interleaving transmission and triggers the frequency hopping transmission, the configuration information also indicates the candidate values of the granularity of interleaving transmission units. As a result, a signaling overhead of dynamically configuring the interleaving transmission units between the base station and the UE is reduced.

In some embodiments, the S120 may also include determining the absolute subframe according to the granularity of the interleaving transmission units, the number of TBs for the multi-TB interleaving transmission and a starting subframe of the multi-TB interleaving transmission.

In an embodiment of the present disclosure, in response to determining the absolute subframe carrying a TB, consideration will be given to the granularity of interleaving transmission units, and comprehensive consideration will also be given to the number of TBs for the multi-TB interleaving transmission. Each TB is a content block, and different TBs include different contents. For example, TB1-TB4 are TBs of which at least partial contents are different.

The starting subframe determines a starting position of the time domain of multi-TB interleaving transmission, and then the granularity of the interleaving transmission units determines the time domain resources occupied by one multi-TB interleaving transmission. The number of TBs and the above-mentioned granularity determine the number of TB interleaving transmissions required. These parameters will jointly determine a position of the TB in the time domain, and then determine the absolute subframe for transmitting these TBs.

In some embodiments, the determining the absolute subframe i according to the granularity of the interleaving transmission units, the number of TBs for the multi-TB interleaving transmission and a starting subframe of the multi-TB interleaving transmission includes:

determining the absolute subframe i according to the following functional relation:

$$j = \left\lceil \frac{(sf(i) - sf(i_0))\%(Tch * X)}{Tch} \right\rceil$$

Where the Tch is a granularity of the interleaving transmission units; the sf ($i_0$) is an absolute subframe No. of the starting subframe $i_0$ of the multi-TB interleaving transmission; the sf(i) is an absolute subframe No. of the absolute subframe i; the X is a number of TBs in the multi-TB interleaving transmission; and the % is a symbol for calculating a remainder after division.

In other embodiments, transmission of other services is possibly inserted between different multi-TB interleaving transmissions. In this way, there is possibly a time domain offset, as a result, in some embodiments, the step of determining the absolute subframe using the following formula may also be included:

$$j = \left\lceil \frac{(sf(i) - sf(i_0) + \theta)\%(Tch * X)}{Tch} \right\rceil$$

Where θ may be a number of time domain offset subframes.

For example, assuming that in the enhanced mobile bandwidth (eMBB) service data included in the current TB, in case that the introduction of ultra-reliable and low-latency communication (URLLC) service is suddenly discovered, it will cause two multi-TB interleaving transmissions to introduce a time interval in the time domain. At this time, the number of time domain subframes carrying the URLLC service data may be represented by θ.

In some embodiments, the S130 may also include determining the first frequency hopping interval Ych1 as the second frequency hopping interval Ych2 or, determining the second frequency hopping interval Ych2 as Ych1*X according to the first frequency hopping interval Ych1 and the number X of TBs for the multi-TB interleaving transmission.

In some embodiments, the S140 may also include determining the narrowband used by the absolute subframe i for transmitting the j-th TB according to a number of frequency hopping narrowbands in the frequency hopping transmission, a starting narrowband in the frequency hopping transmission, an interval of adjacent narrowbands in the frequency hopping transmission, a number of subframes occupied by the multi-TB interleaving transmission, a number of narrowbands included in a system bandwidth, and the second frequency hopping interval.

In some embodiments, the step of determining the narrowband used by the absolute subframe i for transmitting the j-th TB according to a number of frequency hopping narrowbands in the frequency hopping transmission, a starting narrowband in the frequency hopping transmission, an interval of neighboring narrowbands in the frequency hopping transmission, a number of subframes occupied by the multi-TB interleaving transmission, a number of narrowbands included in a system bandwidth, and the second frequency hopping interval includes: determining the narrowband where the subframe of the j-th TB is located according to the following functional relation:

$$n_{NB}^{(i)} = \left(n_{NB}^{(i_0)} + \left(\left\lfloor\frac{i+i_v}{Ych2}\right\rfloor - j_0\right) \bmod N_{NB,hop}^{ch}\right) * f_{NB,hop} \bmod N_{NB}^{ch}$$

$$j_0 = \lfloor (i+i_v)/Ych2 \rfloor$$

$$i_0 \le i \le i_0 + N_{abs} - 1$$

Where the $n_{NB}^{(i)}$ is a narrowband No. of a narrowband used by an absolute subframe i in the multi-TB interleaving transmission; the $n_{NB}^{(i_0)}$ is a narrowband No. of a narrowband used by a starting subframe $i_0$ in the multi-TB interleaving transmission, and the $N_{NB,hop}^{ch}$ is a number of frequency hopping narrowbands in the frequency hopping transmission; the $N_{NB}^{ch}$ is a number of narrowbands included in a system bandwidth; the $N_{abs}$ is a number of absolute subframes occupied by one multi-TB interleaving transmission; the $f_{NB,hop}$ is an interval of adjacent narrowbands in the frequency hopping transmission; and the Ych2 is the second frequency hopping interval. In case that a frame structure for performing the multi-TB interleaving transmission is a first type, the value of the $i_A$ is 0. In case that the frame structure for performing the multi-TB interleaving transmission is a second type, the value of the $i_A$ is Ych2−2. The mod is a remainder after division.

In the embodiment, a frame structure of the first type is a frequency division duplexing (FDD) frame structure. A frame structure of the second type is a time division duplexing (TDD) frame structure. In response to using the FDD, the frame structure used for the multi-TB interleaving transmission is the frame structure of the first type, and in response to using the TDD, the frame structure used for the multi-TB interleaving transmission is the frame structure of the second type.

Figure 8:
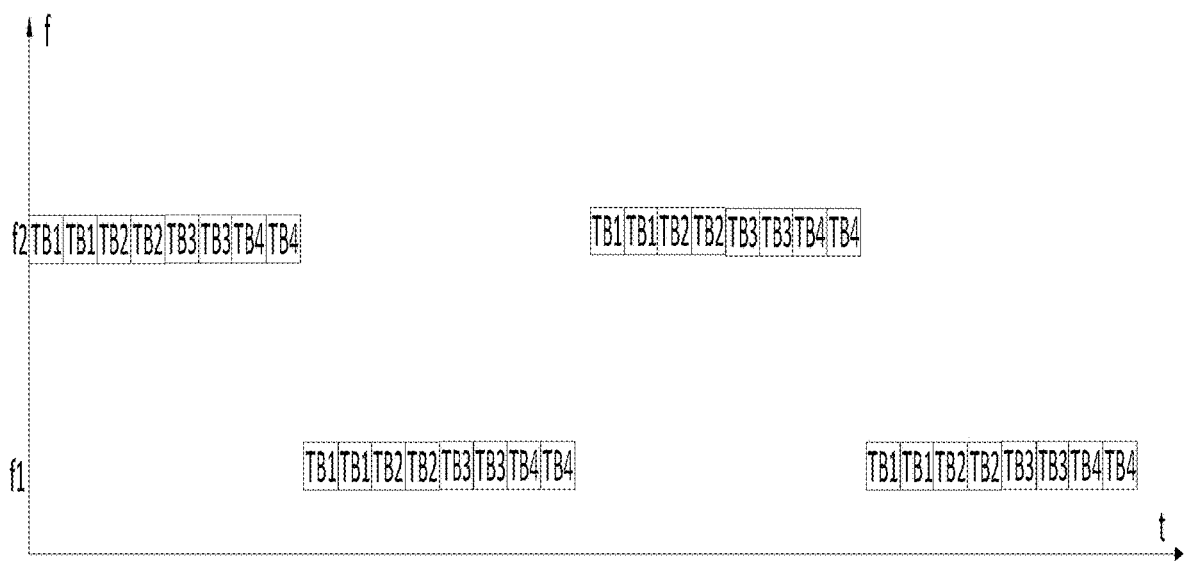
FIG. 8 is a schematic diagram of multi-TB interleaving transmission provided by an embodiment of the present disclosure.
Figure 9:
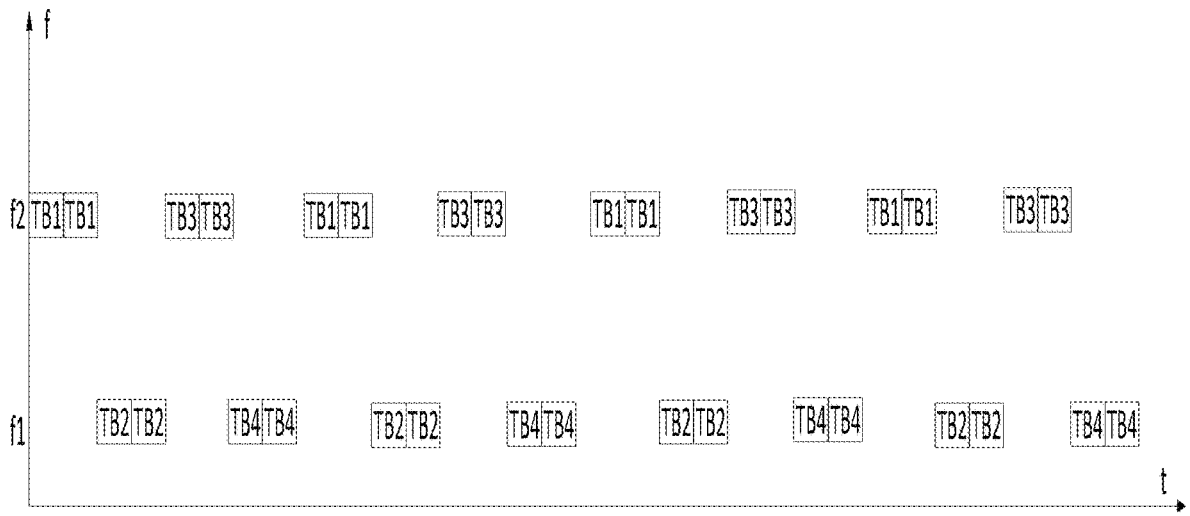
FIG. 9 is a schematic diagram of another multi-TB interleaving transmission provided by an embodiment of the present disclosure.

FIG. 8 and FIG. 9 are under the same number of TBs for multi-TB interleaving transmission and the same granularity of interleaving transmission units, FIG. 8 shows a schematic diagram of multi-TB interleaving transmission in case that Ych2 is equal to Ych1*X, and FIG. 9 shows a schematic diagram of multi-TB interleaving transmission in case that Ych2 is equal to Ych1. In the process of multi-TB interleaving transmission as shown in FIG. 8 and FIG. 9, frequency hopping transmission is used, and two narrowbands are used for the frequency hopping transmission, corresponding to center frequencies of f1 and f2, respectively. Ych1 is two. Since the multi-TB interleaving transmission includes a total of four TBs, namely TB1-TB4, the second frequency hopping interval in the multi-TB interleaving transmission as shown in FIG. 8 is four times the second frequency hopping interval as shown in FIG. 9.

In both FIG. 8 and FIG. 9, the horizontal axis represents a time axis and is indicated by a symbol t, and the vertical axis represents a frequency axis and is indicated by a symbol f.

Figure 7:
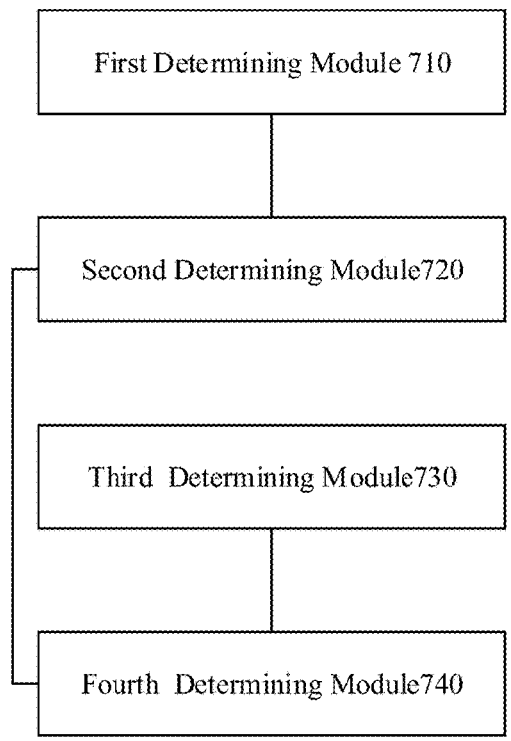
FIG. 7 is a structural diagram of a multi-TB interleaving transmission processing apparatus provided by an embodiment of the present disclosure.

As shown in FIG. 7, an embodiment provides a multi-TB interleaving transmission processing apparatus, including: a first determining module 710, configured to determine a granularity of interleaving transmission units for multi-TB interleaving transmission, where the granularity of the interleaving transmission units is a number of times one TB in the interleaving transmission units being transmitted repeatedly; a second determining module 720, configured to determine an absolute subframe i for transmitting the j-th TB according to the granularity of the interleaving transmission units, where the j is a positive integer, and the i is 0 or a positive integer; a third determining module 730, configured to determine a second frequency hopping interval of the multi-TB interleaving transmission according to a first frequency hopping interval of single-TB frequency hopping transmission; and a fourth determining module 740, configured to determine a narrowband used by the absolute subframe i for transmitting the j-th TB according to the second frequency hopping interval.

In some embodiments, the first determining module 710, the second determining module 720, the third determining module 730 and the fourth determining module 740 may all be program modules. After the program modules are executed by a processor, the determination of the granularity of interleaving transmission units, the determination of the absolute subframes for transmitting different TBs, the determination of the second frequency hopping interval, and the determination of the narrowband used by each subframe can be realized.

In some other embodiments, the first determining module 710, the second determining module 720, the third determining module 730 and the fourth determining module 740 call all be software and hardware integrated modules, the software and hardware integrated modules include, but are not limited to, programmable arrays, and the programmable array may be either a field programmable array or a complex programmable array.

In some other embodiments, the first determining module 710, the second determining module 720, the third determining module 730 and the fourth determining module 740 may all be software and hardware integrated modules, and the software and hardware integrated modules include, but are not limited to, a field programmable array or a complex programmable array.

In some other embodiments, the first determining module 710, the second determining module 720, the third determining module 730 and the fourth determining module 740 may all be pure hardware modules, and the pure hardware modules may be special integrated circuits.

In some embodiments, the first determining module 710 is configured to determine the granularity of the interleaving transmission units according to the first frequency hopping interval Ych1, where the Ych1 is a positive integer.

In some embodiments, the first determining module 710 is configured to execute: determining the Ych1 as the granularity of the interleaving transmission units; selecting a maximum value from a first value set ((1/M1)*Ych1,1) consisting of the Ych1 and a first parameter M1, and determining the maximum value as the granularity of the interleaving transmission units; and determining the granularity of the interleaving transmission units as M2*Ych1 according to the first frequency hopping interval Ych1 and a second parameter M2.

In some embodiments, the first parameter is predefined; configured by a base station; or, determined according to a number of TBs for the multi-TB interleaving transmission.

In some embodiments, the second parameter is configured by higher layer signaling. In some embodiments, the second parameter is determined according to the number of frequency hopping narrowbands for the frequency hopping transmission.

In some embodiments, the first determining module 710 is configured to determine the granularity of the interleaving transmission units according to user dedicated signaling of TBs for the multi-TB interleaving transmission.

In some embodiments, the first determining module 710 is configured to determine the granularity of the interleaving transmission units by selecting a value from a second value set according to the configuration information of the user dedicated signaling, where the second value set includes candidate values of the first frequency hopping interval corresponding to enhanced coverage classes used for TB transmission.

In some embodiments, the second determining module 720 is configured to determine the absolute subframe i according to the granularity of the interleaving transmission units, the number of TBs for the multi-TB interleaving transmission and a starting subframe of the multi-TB interleaving transmission.

In some embodiments, the second determining module 720 is configured to determine the absolute subframe i according to the following functional relation:

$$j = \left\lceil \frac{(sf(i) - sf(i_0)) \% (Tch * X)}{Tch} \right\rceil$$

Where the Tch is a granularity of the interleaving transmission units; the sf ($i_0$) is an absolute subframe No. of the starting subframe $i_0$ of the multi-TB interleaving transmission; the sf (i) is an absolute subframe No. of the absolute subframe i; the X is a number of TBs in the multi-TB interleaving transmission; and the % is a symbol for calculating a remainder after division.

In some embodiments, the third determining module 730 is configured to determine the first frequency hopping interval Ych1 as the second frequency hopping interval Ych2; or, determine the second frequency hopping interval Ych2 as Ych1*X according to the first frequency hopping interval Ych1 and the number X of TBs included in the multi-TB interleaving transmission.

In some embodiments, the fourth determining module 740 is configured to determine the narrowband used by the absolute subframe i for transmitting the j-th TB according to a number of frequency hopping narrowbands in the frequency hopping transmission, a starting narrowband in the frequency hopping transmission, an interval of neighboring narrowbands in the frequency hopping transmission, a number of subframes occupied by the multi-TB interleaving transmission, a number of narrowbands included in a system bandwidth, and the second frequency hopping interval.

In some embodiments, the fourth determining module 740 is configured to determine the narrowband, where the subframe of the j-th TB is located according to the following functional relation:

$$n_{NB}^{(i)} = \left( n_{NB}^{(i_0)} + \left( \left\lfloor \frac{i + i_v}{Ych2} \right\rfloor - j_0 \right) \bmod N_{NB,hop}^{ch} \right) * f_{NB,hop} \bmod N_{NB}^{ch}$$

$$j_0 = \lfloor (i + i_v)/Ych2 \rfloor$$

$$i_0 \le i \le i_0 + N_{abs} - 1$$

Where the $n_{NB}^{(i)}$ is a narrowband No. of a narrowband used by an absolute subframe i in the multi-TB interleaving transmission; the $n_{NB}^{(i_0)}$ is a narrowband No. of a narrowband used by a starting subframe $i_0$ in the multi-TB interleaving transmission, and the $N_{NB,hop}^{ch}$ is a number of frequency hopping narrowbands in the frequency hopping transmission; the $N_{NB}^{ch}$ is a number of narrowbands included in a system bandwidth; the $N_{abs}$ is a number of absolute subframes occupied by one multi-TB interleaving transmission; the $f_{NB,hop}$ is an interval of adjacent narrowbands in the frequency hopping transmission; and the Ych2 is the second frequency hopping interval.

In case that a frame structure for performing the multi-TB interleaving transmission is a first type, the value of the $i_A$ is 0. In case that the frame structure for performing the multi-TB interleaving transmission is a second type, the value of the $i_A$ is Ych2-2.

The fifth aspect of an embodiment of the present disclosure provides a communication device, including a transceiver, a memory, and a processor, connected with the transceiver and the memory respectively, and configured to control the transceiver to transmit and receive wireless signals through executing computer-executable instructions stored in the memory, so as to realize the multi-TB interleaving transmission processing method provided by any of the above-mentioned technical solutions, for example, at least one of the methods as shown in FIG. 2-FIG. 4.

The sixth aspect of an embodiment in the present disclosure provides a non-transitory computer storage medium, where computer-executable instructions are stored in the non-transitory computer storage medium; and the multi-TB interleaving transmission processing method provided by any of the above-mentioned technical solutions, for example, at least one of the methods as shown in FIG. 2-FIG. 4, is realized after the computer-executable instructions are executed by the processor.

Some specific examples are provided below in combination with any of the above-mentioned embodiments.

EXAMPLE

Firstly: the granularity Tch of an interleaving transmission unit is determined, that is, a number of repeated transmissions of one TB in the process of an interleaving transmission unit.

Mode 1: Tch=Ych1, where Ych1 is a user's frequency hopping interval broadcast by a base station, that is, the frequency hopping interval of a single TB;

Mode 2: Tch=max((1/M1)*Ych1,1), where M1 is a predefined value, or a configured value; and Mode 3: Tch is configured by user dedicated signaling, in a FDD coverage enhancement mode A, a value range is {1, 2, 4, 8} repeated transmissions, and in a FDD coverage enhancement mode B, the value range is {2, 4, 8, 16} repeated transmissions. In a TDD coverage enhancement mode A, the value range is {1, 5, 10, 20} repeated transmissions, and in a TDD coverage enhancement mode B, the value range is {5, 10, 20, 40} repeated transmissions.

Second: the TB transmitted in an absolute subframe i is determined according to the following modes. It is assumed that in an interleaving transmission, X TBs are involved in the interleaving transmission. Then the absolute subframe of the j-th TB is transmitted in the subframe SF(i). 0<j<X+1. sf($i_0$) is a No. of an absolute subframe where the first transmission of a first TB in a round of multi-TB interleaving transmission is located. Here, the absolute subframe is jointly determined by a system frame No. and a subframe No., specifically according to the following formula.

$$j = \left\lceil \frac{(sf(i) - sf(i_0))\%(Tch^*X)}{Tch} \right\rceil$$

Third: the frequency hopping interval of the entire interleaving transmission is determined, the frequency hopping interval for one TB is Ych1, and the frequency hopping interval for the entire interleaving transmission of the TB is Ych1*X.

Finally: for the entire interleaving transmission, a narrowband to be used for transmission in the absolute subframe i is determined according to the following mode. $n_{NB}^{(i_0)}$ is the narrowband where the initial transmission is located. $N_{NB,hop}^{ch,DL}$ is the number of frequency hopping narrowbands configured by the system. Taking the downlink TB transmission as an example, for a downlink TB, $f_{NB,hop}^{DL}$ is an interval between adjacent frequency hopping narrowbands configured by the system. $N_{abs}^{PDSCH}$ refers to a number of absolute subframes occupied in one round of interleaving transmission. $N_{NB}^{DL}$ is a number of narrowbands included in a system bandwidth.

$$n_{NB}^{(i)} = \left(n_{NB}^{(i_0)} + \left(\left\lfloor \frac{i+i_V}{Ych1*X} \right\rfloor - j\right) \bmod N_{NB,hop}^{ch,DL}\right) * f_{NB,hop}^{DL}\right) \bmod N_{NB}^{ch,DL}$$

$$j = \lfloor (i+i_V)/(Ych1*X) \rfloor$$

$$i_0 \le i \le i_0 + N_{abs} - 1$$

In case that a frame structure for performing the multi-TB interleaving transmission is a first type, the value of the $i_\Delta$ is 0; and in case that the frame structure for performing the multi-TB interleaving transmission is a second type, the value of the $i_\Delta$ is (Ych1*X)−2.

Example 2

Step 1: determining the granularity Tch of an interleaving transmission unit, that is, a number of repetitions for transmitting one TB in a process of one interleaving transmission.

Tch=M2*Ych1, where Ych1 is a user's frequency hopping interval broadcast by a base station, that is, the frequency hopping interval of a single TB.

M2 may be configured by higher layer signaling, and M2=$N_{NB,hop}^{ch,DL}$ where $N_{NB,hop}^{ch,DL}$ is a number of frequency hopping narrowbands configured by the system.

Step 2: determining which TB is transmitted in an absolute subframe i according to the following modes. It is assumed that in an interleaving transmission, X TBs are involved in the interleaving transmission. Then the absolute subframe of the j-th TB is transmitted in the subframe SF(i). 0<j<X+1. sf($i_0$) is a No. of an absolute subframe where the first transmission of a first TB in a round of multi-TB interleaving transmission is located. Here, the absolute subframe is jointly determined by a system frame No. and a subframe No., specifically according to the following formula.

$$j = \left\lceil \frac{(sf(i) - sf(i_0))\%(Tch*X)}{Tch} \right\rceil$$

Step 3: the frequency hopping interval of the entire multi-TB interleaving transmission is Ych2.

Step 4: for the entire interleaving transmission, a narrowband to be used for transmission in the absolute subframe i is determined according to the following mode. $n_{NB}^{(i_0)}$ is the narrowband where the initial transmission is located. Taking the downlink TB transmission as an example, $N_{NB,hop}^{ch,DL}$ for a downlink TB is the number of frequency hopping narrowbands configured by the system, and $f_{NB,hop}^{DL}$ for the downlink TB is an interval between adjacent frequency hopping narrowbands configured by the system. $N_{abs}^{PDSCH}$ for the downlink TB refers to a number of absolute subframes occupied in one round of interleaving transmission. $N_{NB}^{DL}$ for the downlink TB is a number of narrowbands included in a system bandwidth.

$$n_{NB}^{(i)} = \left(n_{NB}^{(i_0)} + \left(\left\lfloor \frac{i+i_V}{N_{NB}^{ch}} \right\rfloor - j_0\right) \bmod N_{NB,hop}^{ch,DL}\right) * f_{NB,hop}^{DL}\right) \bmod N_{NB}^{ch,DL}$$

$$j = \lfloor (i+i_V)/N_{NB}^{ch,DL} \rfloor$$

$$i_0 \le i \le i_0 + N_{abs}^{PDSCH} - 1$$

In case that a frame structure for performing the multi-TB interleaving transmission is a first type, the value of the $i_\Delta$ is 0. In case that the frame structure for performing the multi-TB interleaving transmission is a second type, the value of the $i_\Delta$ is $N_{NB}^{ch}$−2.

Figure 10:
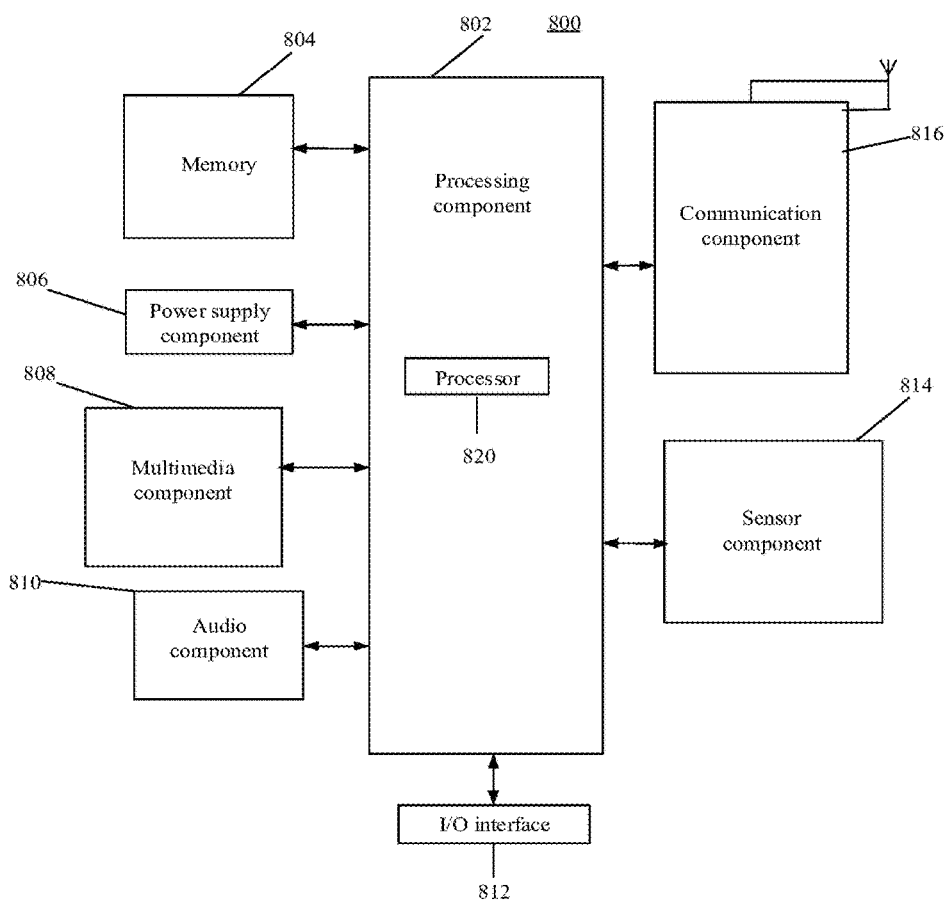
FIG. 10 is a structural diagram of a user equipment (UE) provided by an embodiment of the present disclosure.

FIG. 10 shows the UE according to an example, and the UE specifically may be a mobile phone, a computer, digital broadcasting UE, a message transmitter-receiver, a game console, a tablet device, a medical device, a fitness device and a personal digital assistant.

As shown in FIG. 10, the UE 800 may include one or some of the following components: a processing component 802, a memory 804, a power component 806, a multimedia component 808, an audio component 810, an input/output (I/O) interface 812, a sensor component 814 and a communication component 816.

The processing component 802 generally controls the overall operation of the UE 800, such as operations associated with display, phone calls, data communications, camera operations and recording operations. The processing component 802 may include one or more processors 820 which execute instructions, in order to complete all or part of the above-mentioned method. In addition, the processing component 802 may include one or more modules to facilitate interaction of the processing component 802 with other components. For example, the processing component 802 may include a multimedia module to facilitate interaction of the multimedia component 808 with the processing component 802.

The memory 804 is configured to store various data to support operations on the UE 800. Examples of such data include instructions for any disclosure or method operating on the UE 800, contact data, phonebook data, messages, images, videos, etc. The memory 804 may be implemented by any type of volatile or non-volatile storage device or their combination, such as static random access memory (SRAM), electrically erasable programmable read-only memory (EEPROM), erasable programmable memory programmable read-only memory (EPROM), programmable read-only memory (PROM), read-only memory (ROM), magnetic memory, flash memory, magnetic disk, or optical disk.

The power component 806 provides power to various components of the UE 800. The power component 806 may include a power management system, one or a plurality of power supplies, and other components associated with generating, managing, and distributing power to the UE 800.

The multimedia component 808 includes a screen providing an output interface between the UE 800 and a user. In some embodiments, the screen may include a liquid crystal display (LCD) and a touch panel (TP). If the screen includes a touch panel, the screen may be implemented as a touch screen to receive input signals from a user. The touch panel includes one or a plurality of touch sensors to sense gestures of touching and sliding on the touch panel. The touch sensors can not only sense boundaries of a touch or slide action, but also detect the duration and pressure associated with the touch or slide action. In some embodiments, the multimedia component 808 includes a front camera and/or a rear camera. In case that the UE 800 is in an operation mode, such as shooting mode or video mode, the front camera and/or the rear camera may receive external multimedia data. Each of the front camera and the rear camera may be a fixed optical lens system or have focal length and optical zooming capability.

The audio component 810 is configured to output and/or input audio signals. For example, the audio component 810 includes a microphone (MIC). In case that the UE 800 is in an operation mode, such as call mode, record mode and voice recognition mode, the microphone is configured to receive an external audio signal. The received audio signal may be further stored in the memory 804 or transmitted via the communication component 816. In some embodiments, the audio component 810 also includes a speaker configured to output audio signals.

The I/O interface 812 provides an interface between the processing component 802 and a peripheral interface module, and the peripheral interface module may be a keyboard, a click wheel or buttons. These buttons may include, but are not limited to, a home button, volume buttons, a start button, and a lock button.

The sensor component 814 includes one or a plurality of sensors configured to provide various aspects of status assessment for the UE 800. For example, the sensor component 814 may detect an on/off state of the UE 800, and the relative positioning of components, such as components are the display and a keypad of the UE 800. The sensor component 814 may also detect the positional change of the UE 800 or a component of the UE 800, the presence or absence of user contact with the UE 800, the direction or acceleration/deceleration of the UE 800, and a change in the temperature of the UE 800. The sensor component 814 may include a proximity sensor which is configured to detect the presence of nearby objects in the absence of any physical contact. The sensor component 814 may also include a light sensor, such as CMOS or CCD image sensor, which is configured to be used in an imaging disclosure. In some embodiments, the sensor component 814 may also include an acceleration sensor, a gyroscope sensor, a magnetic sensor, a pressure sensor, or a temperature sensor.

The communication component 816 is configured to facilitate wired or wireless communication between the UE 800 and other devices. The UE 800 may be accessed to a wireless network based on a communication standard, such as Wi-Fi, 2G or 3G, or their combination. In an example, the communication component 816 receives broadcast signals or broadcast related information from an external broadcast management system via a broadcast channel. In an example, the communication component 816 also includes a near field communication (NFC) module so as to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an example, the UE 800 may be implemented by one or a plurality disclosure specific integrated circuits (ASICs), a digital signal processor (DSP), a digital signal processing device (DSPD), a programmable logic device (PLD), a field programmable gate array (FPGA), a controller, a micro-controller, a microprocessor, or other electronic components, in order to implement the above method.

In an example, a non-temporary computer readable storage medium containing instructions is also provided, such as a memory 804 containing instructions, and the above-mentioned instructions may be executed by the processor 820 of the UE 800 in order to complete the above-mentioned method. For example, the non-temporary computer readable storage medium may be an ROM, a random access memory (RAM), a CD-ROM, a magnetic tape, a floppy disk, and an optical data storage device.

Figure 11:
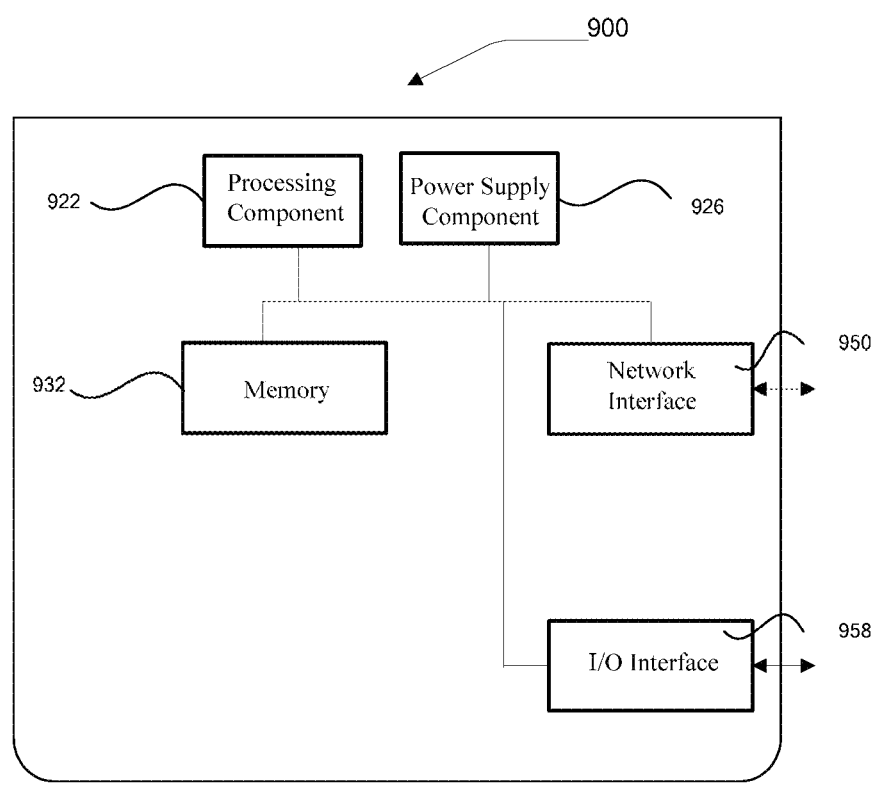
FIG. 11 is a structural diagram of a base station provided by an embodiment of the present disclosure.

FIG. 11 is a schematic diagram of a base station. As shown in FIG. 11, the base station 900 includes a processing component 922 which further includes one or a plurality of processors, and a memory resource represented by a memory 932 configured to store instructions executable by the processing component 922, such as a disclosure program. The disclosure program stored in the memory 932 may include one or more modules, and each of the modules corresponds to a set of instructions. In addition, the processing component 922 is configured to execute instructions so as to execute the PDCCH listening method as shown in FIG. 4 or FIG. 5.

The base station 900 may also include a power supply component 926 configured to perform power management of the base station 900, a wired or wireless network interface 950 configured to connect the base station 900 to a network, and an input/output (I/O) interface 958. The base station 900 may operate an operating system based on being stored in the memory 932, such as Windows Server™, Mac OS X™, Unix™, Linux™, Free BSD™ or the like.

Those skilled in the art will easily obtain other embodiments of the present disclosure after considering the Description and practicing the disclosed invention. The present disclosure is intended to cover any variation, disclosure or adaptive change of the present disclosure, and these variations, disclosures or adaptive changes follow the general principle of the present disclosure and include common general knowledge or conventional technical means in the technical field not disclosed in the present disclosure. The Description and the embodiments are merely deemed as examples, and the real scope and spirit of the present disclosure are indicated by the following claims.

We ought to understand that, the present disclosure is not limited to the accurate structures as described previously and shown in the drawings, and various modifications and changes can be made without departing from the scope. The scope of the present disclosure is merely defined by the claims attached.

The first aspect of an embodiment in the present disclosure provides a multi-TB interleaving transmission processing method, including:

determining a granularity of interleaving transmission units for multi-TB interleaving transmission, where the granularity of the interleaving transmission units is a number of times one TB in the interleaving transmission units being transmitted repeatedly;

determining an absolute subframe i for transmitting the j-th TB according to the granularity of the interleaving transmission units, where the j is a positive integer, and the i is 0 or a positive integer;

determining a second frequency hopping interval of the multi-TB interleaving transmission according to a first frequency hopping interval of single-TB frequency hopping transmission; and determining a narrowband used by the absolute subframe i for transmitting the j-th TB according to the second frequency hopping interval.

Based on the above scheme, the determining a granularity of interleaving transmission units for multi-TB interleaving transmission includes:

determining the granularity of the interleaving transmission units according to the first frequency hopping interval Ych1, where the Ych1 is a positive integer.

Based on the above scheme, the determining the granularity of the interleaving transmission units according to the first frequency hopping interval Ych1 includes at least one of the following:

determining the Ych1 as the granularity of the interleaving transmission units;

selecting a maximum value from a first value set ((1/M1)*Ych1,1) consisting of the Ych1 and a first parameter M1, and determining the maximum value as the granularity of the interleaving transmission units; and determining the granularity of the interleaving transmission units as M2*Ych1 according to the first frequency hopping interval Ych1 and a second parameter M2.

Based on the above scheme, the first parameter is predefined; or, the first parameter is configured by a base station; or, the first parameter is determined according to a number of TBs in the multi-TB interleaving transmission.

Based on the above scheme, the second parameter is configured by higher layer signaling.

Based on the above scheme, the second parameter is determined according to a number of frequency hopping narrowbands in the frequency hopping transmission.

Based on the above scheme, the determining the granularity of interleaving transmission units for multi-TB interleaving transmission includes determining the granularity of the interleaving transmission units according to user dedicated signaling of TBs for the multi-TB interleaving transmission.

Based on the above scheme, the determining the granularity of the interleaving transmission units according to user dedicated signaling of TBs for the multi-TB interleaving transmission includes determining the granularity of the interleaving transmission units by selecting a value from a second value set according to the configuration information of the user dedicated signaling, where the second value set includes candidate values of the first frequency hopping interval corresponding to enhanced coverage classes used for TB transmission.

Based on the above scheme, the determining an absolute subframe i for transmitting the j-th TB according to the granularity of the interleaving transmission units includes determining the absolute subframe i according to the granularity of the interleaving transmission units, the number of TBs for the multi-TB interleaving transmission and a starting subframe of the multi-TB interleaving transmission.

Based on the above scheme, the determining the absolute subframe i according to the granularity of the interleaving transmission units, the number of TBs for the multi-TB interleaving transmission and a starting subframe of the multi-TB interleaving transmission includes:

determining the absolute subframe i according to the following functional relation;

$$j = \left\lceil \frac{(sf(i) - sf(i_0)) \ \% \ (Tch * X)}{Tch} \right\rceil$$

where the Tch is a granularity of the interleaving transmission units, the $sf(i_0)$ is an absolute subframe No. of the starting subframe $i_0$ of the multi-TB interleaving transmission; the $sf(i)$ is an absolute subframe No. of the absolute subframe i; the X is a number of TBs in the multi-TB interleaving transmission; and the % is a symbol for calculating a remainder after division.

Based on the above scheme, the determining a second frequency hopping interval of the multi-TB interleaving transmission according to a first frequency hopping interval of frequency hopping transmission includes:

determining the first frequency hopping interval Ych1 as the second frequency hopping interval Ych2; or, determining the second frequency hopping interval Ych2 as Ych1*X according to the first frequency hopping interval Ych1 and the number X of TBs for the multi-TB interleaving transmission.

Based on the above scheme, the determining a narrowband used by the absolute subframe i for transmitting the j-th TB according to the second frequency hopping interval includes determining the narrowband used by the absolute subframe i for transmitting the j-th TB according to a number of frequency hopping narrowbands in the frequency hopping transmission, a starting narrowband in the frequency hopping transmission, an interval of adjacent narrowbands in the frequency hopping transmission, a number of subframes occupied by the multi-TB interleaving transmission, a number of narrowbands included in a system bandwidth, and the second frequency hopping interval.

Based on the above scheme, the determining the narrowband used by the absolute subframe i for transmitting the j-th TB according to a number of frequency hopping narrowbands in the frequency hopping transmission, a starting narrowband in the frequency hopping transmission, an interval of adjacent narrowbands in the frequency hopping transmission, a number of subframes occupied by the multi-TB interleaving transmission, a number of narrowbands included in a system bandwidth, and the second frequency hopping interval includes:

determining the narrowband where the subframe of the j-th TB is located according to the following functional relation;

$$n_{NB}^{(i)} = \left(n_{NB}^{(i_0)} + \left(\left\lfloor \frac{i+i_V}{Ych2} \right\rfloor - j_0 \right) \bmod N_{NB,hop}^{ch} \right) * f_{NB,hop} \bmod N_{NB}^{ch}$$

$$j = \lfloor (i+i_V)/Ych2 \rfloor$$

$$i_0 \le i \le i_0 + N_{abs} - 1$$

where the $n_{NB}^{(i)}$ is a narrowband No. of a narrowband used by an absolute subframe in the multi-TB interleaving transmission; the $n_{NB}^{(i_0)}$ is a narrowband No. of a narrowband used by a starting subframe $i_0$ in the multi-TB interleaving transmission, and the $N_{NB,hop}^{ch}$ is a number of frequency hopping narrowbands in the frequency hopping transmission; the $N_{NB}^{ch}$ is a number of narrowbands included in a system bandwidth; the $N_{abs}$ is a number of absolute subframes occupied by one multi-TB interleaving transmission; the $f_{NB,hop}$ is an interval of adjacent narrowbands in the frequency hopping transmission; and the Ych2 is the second frequency hopping interval;

in case that a frame structure for performing the multi-TB interleaving transmission is a first type, the value of the $i_A$ is 0; and in case that the frame structure for performing the multi-TB interleaving transmission is a second type, the value of the $i_A$ is Ych2-2.

The second aspect of an embodiment in the present disclosure provides a multi-TB interleaving transmission processing apparatus, including:

a first determining module, configured to determine a granularity of interleaving transmission units for multi-TB interleaving transmission, where the granularity of the interleaving transmission units is a number of times one TB in the interleaving transmission units being transmitted repeatedly;

a second determining module, configured to determine an absolute subframe i for transmitting the j-th TB according to the granularity of the interleaving transmission units, where the j is a positive integer, and the i is 0 or a positive integer;

a third determining module, configured to determine a second frequency hopping interval of the multi-TB interleaving transmission according to a first frequency hopping interval of single-TB frequency hopping transmission; and a fourth determining module, configured to determine a narrowband used by the absolute subframe i for transmitting the j-th TB according to the second frequency hopping interval.

Based on the above scheme, the first determining module is configured to determine the granularity of the interleaving transmission units according to the first frequency hopping interval Ych1, where the Ych1 is a positive integer.

Based on the above scheme, the first determining module is configured to execute at least one of the following:

determining the Ych1 as the granularity of the interleaving transmission units;

selecting a maximum value from a first value set ((1/M1)*Ych1,1) consisting of the Ych1 and a first parameter M1, and determining the maximum value as the granularity of the interleaving transmission units; and determining the granularity of the interleaving transmission units as M2*Ych1 according to the first frequency hopping interval Ych1 and a second parameter M2.

Based on the above scheme, the first parameter is predefined; configured by a base station; or determined according to a number of TBs for the multi-TB interleaving transmission.

Based on the above scheme, the second parameter is configured by higher layer signaling.

Based on the above scheme, the second parameter is determined according to a number of frequency hopping narrowbands for frequency hopping transmission.

Based on the above scheme, the determining the granularity of interleaving transmission units in multi-TB interleaving transmission includes determining the granularity of the interleaving transmission units according to user dedicated signaling of TBs included in the multi-TB interleaving transmission.

Based on the above scheme, the first determining module is configured to determine the granularity of the interleaving transmission units by selecting a value from a second value set according to the configuration information of the user dedicated signaling, where the second value set includes candidate values of the first frequency hopping interval corresponding to enhanced coverage classes used for TB transmission.

Based on the above scheme, the second determining module is configured to determine the absolute subframe i according to the granularity of the interleaving transmission units, the number of TBs included for the multi-TB interleaving transmission and a starting subframe of the multi-TB interleaving transmission.

Based on the above scheme, the second determining module is configured to determine the absolute subframe i according to the following functional relation;

$$j = \left\lceil \frac{(sf(i) - sf(i_0)) \% (Tch * X)}{Tch} \right\rceil$$

where the Tch is a granularity of the interleaving transmission units; the $sf(i_0)$ is an absolute subframe No. of the starting subframe $i_0$ of the multi-TB interleaving transmission; the $sf(i)$ is an absolute subframe No. of the absolute subframe i; the X is a number of TBs in the multi-TB interleaving transmission; and the % is a symbol for calculating a remainder after division.

Based on the above scheme, the third determining module is configured to determine the first frequency hopping interval Ych1 as the second frequency hopping interval Ych2; or, determine the second frequency hopping interval Ych2 as Ych1*X according to the first frequency hopping interval Ych1 and the number X of TBs for the multi-TB interleaving transmission.

Based on the above scheme, the fourth determining module is configured to determine the narrowband used by the absolute subframe i for transmitting the j-th TB according to a number of frequency hopping narrowbands in the frequency hopping transmission, a starting narrowband in the frequency hopping transmission, an interval of adjacent narrowbands in the frequency hopping transmission, a number of subframes occupied by the multi-TB interleaving transmission, a number of narrowbands included in a system bandwidth, and the second frequency hopping interval.

Based on the above scheme, the fourth determining module is configured to determine the narrowband where the subframe of the j-th TB is located according to the following functional relation;

$$n_{NB}^{(i)} = \left(n_{NB}^{(i_0)} + \left(\left\lfloor \frac{i+i_V}{Ych2} \right\rfloor - j_0 \right) \bmod N_{NB,hop}^{ch} \right) * f_{NB,hop} \bmod N_{NB}^{ch}$$

-continued $$j = \lfloor (i + i_V)/Ych2 \rfloor$$

$$i_0 \le i \le i_0 + N_{abs} - 1$$

where the $n_{NB}^{(i)}$ is a narrowband No. of a narrowband used by an absolute subframe i in the multi-TB interleaving transmission; the $n_{NB}^{(i_0)}$ is a narrowband No. of a narrowband used by a starting subframe $i_0$ in the multi-TB interleaving transmission; the $N_{NB,hop}^{ch}$ is a number of frequency hopping narrowbands in the frequency hopping transmission; the $_{NB}^{ch}$ is a number of narrowbands included in a system bandwidth; the $N_{abs}$ is a number of absolute subframes occupied by one multi-TB interleaving transmission; the $f_{NB,hop}$ is an interval of adjacent narrowbands in the frequency hopping transmission; and the Ych2 is the second frequency hopping interval;

in case that a frame structure for performing the multi-TB interleaving transmission is a first type, the value of the $i_A$ is 0; and in case that the frame structure for performing the multi-TB interleaving transmission is a second type, the value of the $i_A$ is Ych2–2.

The third aspect of an embodiment in the present disclosure provides a communication device, including:

a transceiver;

a memory; and a processor, connected with the transceiver and the memory respectively, and configured to control the transceiver to transmit and receive wireless signals through executing computer-executable instructions stored in the memory, so as to realize the method provided by any of the technical solutions described in the above-mentioned first aspect.

The fourth aspect of an embodiment in the present application provides a non-transitory computer storage medium, where computer-executable instructions are stored in the non-transitory computer storage medium; and the method provided by any of the technical solutions described in the above-mentioned first aspect is realized after the computer-executable instructions are executed by the processor.

What is claimed is:

1. A multi-transmission block (TB) interleaving transmission processing method, comprising:
   determining a narrowband used by an absolute subframe i for transmitting a jth TB according to a first frequency hopping interval of single-TB frequency hopping transmission; wherein the absolute subframe i is determined according to a number of times one TB is repeatedly transmitted in interleaving transmission units of multi-TB interleaving transmission, wherein the j is a positive integer, and the i is 0 or a positive integer;
   wherein determining the narrowband used by the absolute subframe i for transmitting the jth TB according to the first frequency hopping interval of single-TB frequency hopping transmission comprises:
   determining a second frequency hopping interval of the multi-TB interleaving transmission according to the first frequency hopping interval of single-TB frequency hopping transmission; and
   determining the narrowband used by the absolute subframe i for transmitting the jth TB according to the second frequency hopping interval.

2. The method of claim 1, wherein the first frequency hopping interval is Ych1, and the method further comprises: determining the number of times one TB is repeatedly transmitted in the interleaving transmission units according to the Ych1.

3. The method of claim 2, wherein determining the number of times one TB is repeatedly transmitted in the interleaving transmission units according to the Ych1 comprises:
   selecting a maximum value from a first value set (1/M1*Ych1,1) consisting of the Ych1 and a first parameter M1, and determining the maximum value as the number of times one TB is repeatedly transmitted in the interleaving transmission units; or
   determining the number of times one TB is repeatedly transmitted in the interleaving transmission units as M2*Ych1 according to the first frequency hopping interval Ych1 and a second parameter M2.

4. The method of claim 3, wherein
   the first parameter is predefined.

5. The method of claim 3, wherein the second parameter is configured by higher layer signaling.

6. The method of claim 3, wherein the second parameter is determined according to a number of frequency hopping narrowbands for the frequency hopping transmission.

7. The method of claim 3, wherein the first parameter is configured by a base station.

8. The method of claim 3, wherein the first parameter is determined according to a number of TBs for the multi-TB interleaving transmission.

9. The method of claim 3, wherein
   in case that the Ych1 is less than a preset value, the number of times one TB is repeatedly transmitted in the interleaving transmission units is determined as M2*Ych1 according to the Ych1 and the M2;
   in case that the Ych1 is greater than or equal to the preset value, the number of times one TB is repeatedly transmitted in the interleaving transmission units is determined as the maximum value from the (1/M1*Ych1,1) consisting of the Ych1 and the M1.

10. The method of claim 2, wherein determining the number of times one TB is repeatedly transmitted in the interleaving transmission units according to the Ych1 comprises:
    determining the Ych1 as the number of times one TB is repeatedly transmitted in the interleaving transmission units.

11. The method of claim 1, wherein the method further comprises:
    determining the number of times one TB is repeatedly transmitted in the interleaving transmission units according to user dedicated signaling of TBs for the multi-TB interleaving transmission.

12. The method of claim 11, wherein determining the number of times one TB is repeatedly transmitted in the interleaving transmission units according to the user dedicated signaling of TBs for the multi-TB interleaving transmission comprises:
    determining the number of times one TB is repeatedly transmitted in the interleaving transmission units by selecting a value from a second value set according to the configuration information of the user dedicated signaling, wherein the second value set includes candidate values of the first frequency hopping interval corresponding to enhanced coverage classes used for TB transmission.

13. The method of claim 1, wherein the first frequency hopping interval is Ych1, the second frequency hopping interval is Ych2, and determining the second frequency hopping interval of the multi-TB interleaving transmission according to the first frequency hopping interval of single-TB frequency hopping transmission comprises:
determining the Ych1 as the Ych2.

14. The method of claim 13, wherein determining the narrowband used by the absolute subframe i for transmitting the jth TB according to the second frequency hopping interval comprises:
determining the narrowband used by the absolute subframe i for transmitting the jth TB according to a number of frequency hopping narrowbands in the frequency hopping transmission, a starting narrowband in the frequency hopping transmission, an interval of adjacent narrowbands in the frequency hopping transmission, a number of subframes occupied by the multi-TB interleaving transmission, a number of narrowbands included in a system bandwidth, and the second frequency hopping interval.

15. The method of claim 14, wherein determining the narrowband used by the absolute subframe i for transmitting the jth TB according to the number of frequency hopping narrowbands in the frequency hopping transmission, the starting narrowband in the frequency hopping transmission, the interval of neighboring narrowbands in the frequency hopping transmission, the number of subframes occupied by the multi-TB interleaving transmission, the number of narrowbands included in the system bandwidth, and the second frequency hopping interval comprises:
determining the narrowband used by the subframe of the jth TB according to the following functional relation;

$$n_{NB}^{(i)} = \left(n_{NB}^{(i_0)} + \left(\left\lfloor \frac{i+i_V}{Ych2} \right\rfloor - j_0 \right\rfloor \bmod N_{NB,hop}^{ch}\right) * f_{NB,hop} \right) \bmod N_{NB}^{ch}$$

$$j = \lfloor (i+i_V)/Ych2 \rfloor$$

$$i_0 \le i \le i_0 + N_{abs} - 1$$

wherein the $n_{NB}^{(i)}$ is a narrowband No. of a narrowband used by the absolute subframe i in the multi-TB interleaving transmission; the $n_{NB}^{(i_0)}$ is a narrowband No. of a narrowband used by a starting subframe $i_0$ in the multi-TB interleaving transmission; the $N_{NB,hop}^{ch}$ is a number of frequency hopping narrowbands in the frequency hopping transmission; the $_{NB}^{ch}$ is a number of narrowbands included in the system bandwidth; the $N_{abs}$ is a number of absolute subframes occupied by one multi-TB interleaving transmission; the $f_{NB,hop}$ is the interval of adjacent narrowbands in the frequency hopping transmission; and the Ych2 is the second frequency hopping interval;
in case that a frame structure for performing the multi-TB interleaving transmission is a first type, the value of the $i_A$ is 0; and
in case that the frame structure for performing the multi-TB interleaving transmission is a second type, the value of the $i_A$ is Ych2-2.

16. The method of claim 1, wherein the first frequency hopping interval is Ych1, the second frequency hopping interval is Ych2, and determining the second frequency hopping interval of the multi-TB interleaving transmission according to the first frequency hopping interval of single-TB frequency hopping transmission comprises:
determining the Ych2 as Ych1*X according to the first Ych1 and the number X of TBs for the multi-TB interleaving transmission.

17. The method of claim 1, wherein the method further comprises:
determining the absolute subframe i of the jth TB according to the number of times one TB is repeatedly transmitted in the interleaving transmission units.

18. The method of claim 17, wherein determining the absolute subframe i of the jth TB according to the number of times one TB is repeatedly transmitted in the interleaving transmission units comprises:
determining the absolute subframe i according to the number of times one TB is repeatedly transmitted in the interleaving transmission units, a number of TBs for the multi-TB interleaving transmission and a starting subframe of the multi-TB interleaving transmission.

19. The method of claim 18, wherein determining the absolute subframe i according to the number of times one TB is repeatedly transmitted in the interleaving transmission units, the number of TBs for the multi-TB interleaving transmission and the starting subframe of the multi-TB interleaving transmission comprises:
determining the absolute subframe i according to the following functional relation;

$$j = \left\lceil \frac{(sf(i) - sf(i_0)) \% (Tch * X)}{Tch} \right\rceil$$

where the Tch is the number of times one TB is repeatedly transmitted in the interleaving transmission units; the $sf(i_0)$ is an absolute subframe No. of the starting subframe i, of the multi-TB interleaving transmission; the sf(i) is an absolute subframe No. of the absolute subframe i;
the X is a number of TBs in the multi-TB interleaving transmission; and the % is a symbol for calculating a remainder after division.

20. A communication device, comprising:
a transceiver;
a memory; and
a processor, connected with the transceiver and the memory respectively, and configured to control the transceiver to transmit and receive wireless signals through executing computer-executable instructions stored in the memory, so as to realize the method comprise:
determining a narrowband used by an absolute subframe i for transmitting a jth TB according to first frequency hopping interval of single-TB frequency hopping transmission; wherein the absolute subframe i is determined according to a number of times one TB is repeatedly transmitted in interleaving transmission units, wherein the j is a positive integer, and the i is 0 or a positive integer;
wherein determining the narrowband used by the absolute subframe i for transmitting the jth TB according to the first frequency hopping interval of single-TB frequency hopping transmission comprises:
determining a second frequency hopping interval of the multi-TB interleaving transmission according to the first frequency hopping interval of single-TB frequency hopping transmission; and
determining the narrowband used by the absolute subframe i for transmitting the jth TB according to the second frequency hopping interval.

* * * * *